United States Patent [19]

Shackleton

[11] Patent Number: 5,435,944
[45] Date of Patent: Jul. 25, 1995

[54] MANUFACTURE OF CABLES WITH AN EASILY SEPARABLE CHANNEL COVER

[75] Inventor: Nigel Shackleton, Gwent, United Kingdom

[73] Assignee: Northern Telecom Limited, Montreal, Canada

[21] Appl. No.: 133,141

[22] PCT Filed: May 8, 1992

[86] PCT No.: PCT/GB92/00839

§ 371 Date: Oct. 14, 1993

§ 102(e) Date: Oct. 14, 1993

[87] PCT Pub. No.: WO92/20510

PCT Pub. Date: Nov. 26, 1992

[30] Foreign Application Priority Data

May 11, 1991 [GB] United Kingdom ............ 9110256

[51] Int. Cl.6 .................. B29D 11/00; B29C 47/02
[52] U.S. Cl. ....................... 264/1.28; 264/1.29; 264/1.6; 264/1.7; 264/174; 425/113; 425/467
[58] Field of Search .......... 264/146, 174, 1.6, 1.28, 264/1.29, 1.7; 425/113, 114, 467

[56] References Cited

U.S. PATENT DOCUMENTS

| | | | |
|---|---|---|---|
| 2,076,711 | 4/1937 | Eagleson | 264/174 |
| 2,149,002 | 2/1939 | Wermine | 264/174 |
| 2,176,233 | 10/1939 | Wermine | 264/174 |
| 2,204,782 | 6/1940 | Wermine | 264/174 |
| 2,626,302 | 1/1953 | Cox . | |
| 3,383,736 | 5/1968 | Brandt | 425/114 |
| 3,527,859 | 9/1970 | Fairbanks | 264/146 |
| 3,952,407 | 4/1976 | Aupoix et al. | 425/114 |
| 4,354,989 | 10/1982 | Beach | 425/114 |
| 4,474,638 | 10/1984 | Einsle | 264/1.5 |
| 4,810,429 | 3/1989 | Mayr | 264/1.5 |

FOREIGN PATENT DOCUMENTS

| | | |
|---|---|---|
| 20036 | 12/1980 | European Pat. Off. . |
| 2555764 | 5/1985 | France .................. 264/1.5 |
| 1665547 | 3/1971 | Germany ............ 264/146 |
| 3922475 | 1/1991 | Germany . |
| 614059 | 12/1948 | United Kingdom . |
| 1128177 | 9/1968 | United Kingdom . |
| 1175019 | 12/1969 | United Kingdom . |
| 1327186 | 8/1973 | United Kingdom . |
| 1386758 | 3/1975 | United Kingdom . |
| 1531817 | 8/1978 | United Kingdom . |
| 1587227 | 4/1981 | United Kingdom . |
| 22202485 | 9/1988 | United Kingdom . |

Primary Examiner—Mathieu D. Vargot
Attorney, Agent, or Firm—Brooks Haidt Haffner & Delahunty

[57] ABSTRACT

Method and apparatus for manufacturing a cable having a channel for receiving energy conductors, e.g. optical fibers, with a channel cover which has a weak bond with the material forming the channel to facilitate removal of the cover. The plastic material which provides the channel and the plastic material which forms the cover are simultaneously extruded around optical fibers in two flows which are separated in advance of enclosing the fibers and which join with a weak bond as the flows meet thereafter. In the apparatus, the extruder has a tubular element through which the fibers are fed and the tubular element divides the plastic material into two separate flows in advance of a die. The tubular member is adjustable in position with respect to the die to balance or equalize the plastics flow.

8 Claims, 2 Drawing Sheets

MANUFACTURE OF CABLES WITH AN EASILY SEPARABLE CHANNEL COVER

BACKGROUND OF THE INVENTION

FIELD OF THE INVENTION

This invention relates to a process and applications for manufacturing cables, particularly optical fibre cables, by plastics extrusion.

RELATED ART

Fibre optic cables in which fibre elements are loosely contained within a channel or tube are currently manufactured by a multistage process. A channel/strength member is first made e.g. by profile extrusion. Next the fibre element is fed into the channel which is closed by a close-fitting sealing strip. The assembly is then fed into an extruder to apply a protective plastics sheath.

In an attempt to reduce manufacturing costs it has been proposed to manufacture such a cable by a single extrusion. However this results in a structure in which access to the fibre elements is rendered extremely difficult. It will be appreciated that it is necessary to access the fibres at various points along a cable to provide junctions and terminations.

BRIEF SUMMARY OF THE INVENTION

The object of the invention is to minimise or to overcome this disadvantage.

According to one aspect of the invention there is provided a method of manufacturing a fibre optic cable by extrusion of a plastics material through a die around a fibre optic element so as to contain the element loosely, wherein during extrusion the plastics flow is partitioned into two or more separate flows by a tubular member through which the fibre optic element is fed over a distance such that, when the flows recombine, a weak bond is formed at the interface therebetween whereby to facilitate selective splitting of the plastics of the cable to access the fibre optic elements.

According to another aspect of the invention there is provided an apparatus for manufacturing a fibre optic cable, the apparatus including a plastics extruder for providing a plastics protection around a fibre optic element by extrusion through a die, the extruder having a tubular member through which the optical element is fed and arranged to partition extruded plastics material into two or more separate flows over a distance such that, when the flows are recombined, a weak bond us formed therebetween whereby to facilitate selective splitting of the plastics of the cable to access the fibre optic element.

The technique is of particular application to the manufacture of self-supporting or aerial cables in which optical fibre elements are contained in a channel formed in a longitudinal dielectric strength member.

Reference is here directed to our copending United Kingdom Application No. 91 10264.0 of even date which relates to cable construction formed e.g. by the process described in the present application.

BRIEF DESCRIPTION OF THE DRAWINGS

Embodiments of the invention will now be described with reference to the accompanying drawings in which.

DESCRIPTION OF PREFERRED EMBODIMENTS

Figure 1:
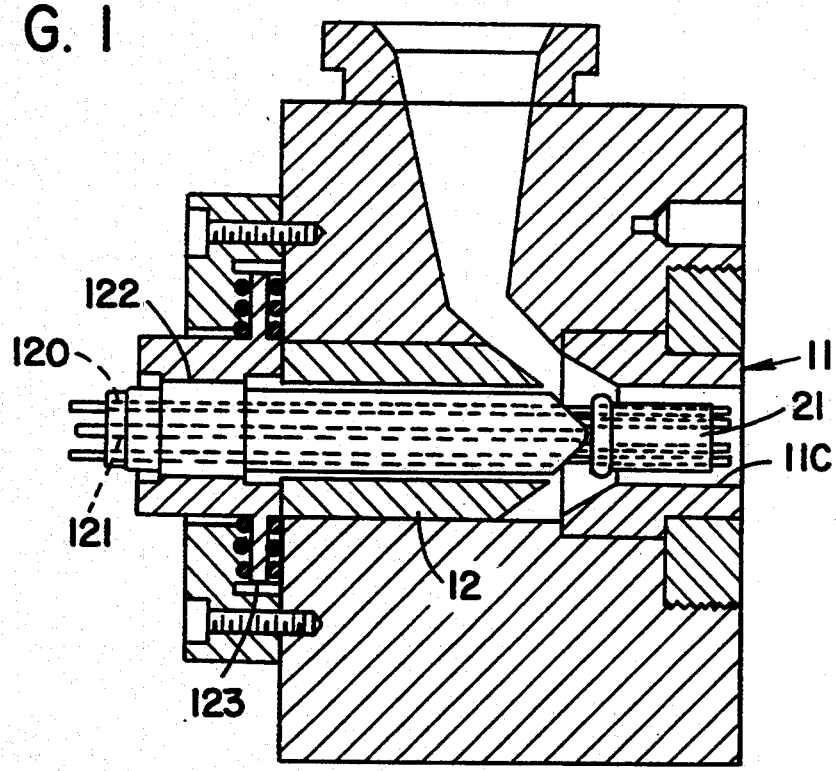
FIG. 1 is a cross-sectional part-schematic view of split flow extrusion applications.
Figure 1A:
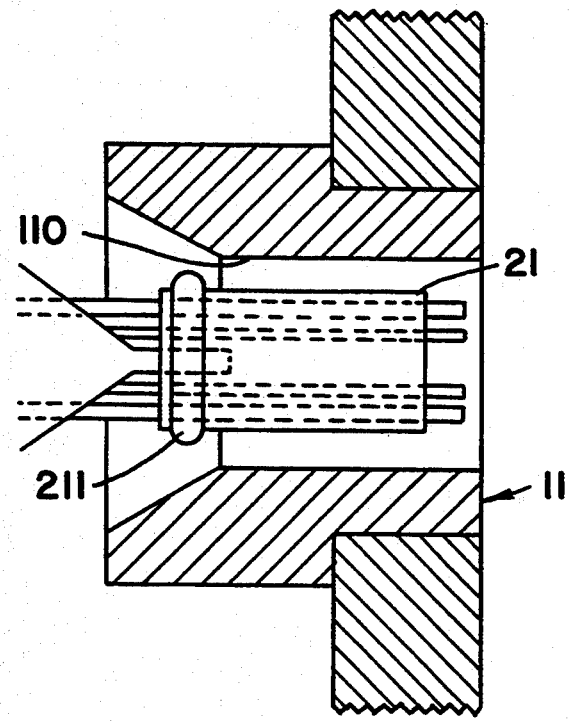
FIG. 1a is an enlarged view of a portion of the apparatus shown in FIG. 1.
Figure 2:
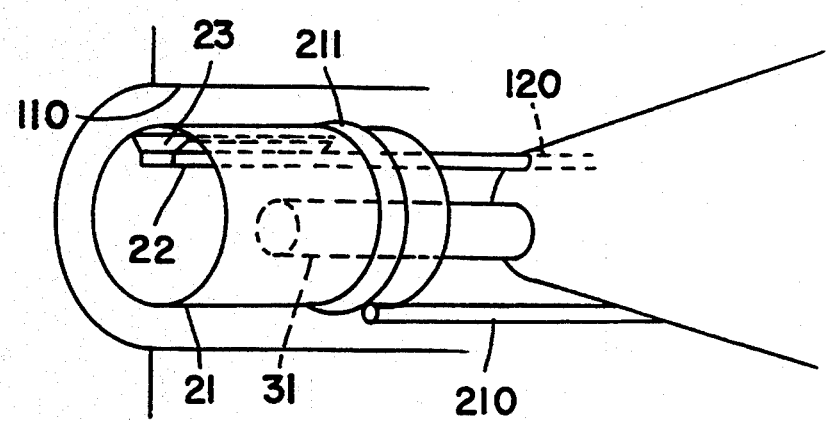
FIG. 2 shows a tool or point assembly for use with the extruder of FIG. 1.

Referring to FIGS. 1 and 2, the extruded includes a die 11 defining the outer form of an extruder cable and into the throat 110 of which a point assembly 12 projects. The point assembly has one or more passageways 120 for receiving optical fibre elements to be sheathed and may also have a further passageway 121 for receiving a cable strength member, e.g. a dielectric strength member. Advantageously a bearing 123 is provided whereby the point assembly 12 may be rotated relative to the die e.g. to impart an S-Z twist into the extruded cable.

The construction of the point assembly is shown in more detail in FIG. 2. As can be seen from FIG. 2 the assembly includes a hollow generally cylindrical shield member 21 supported via a rod 210 and a circumferential clamp 211 whereby the position of the point assembly within the extruder may be adjusted. In use the plastics material flows both through and outside the shield member. Within the shield member 21 a generally rectangular tube 22 is disposed. This tube receives the fibre ribbon element and defines the channel in the cable within which that element is accommodated. The tube 22 communicates with the passageway 120 in the extruder whereby the fibre ribbon may be fed into the extruder. In some applications the channel containing the fibre element may be filled with a water blocking gel during manufacture of the cable.

The tube 22 is supported within the shield 21 by one or more flat plates 23 extending from the inner surface of the shield 21.

During extrusion the shield 21 and the plates 23 each provide a surface barrier between regions of extruding plastics material at least part way through the throat of the die. We have found that, by separating the plastics flow within the die region, the rejoined flows extruding from the die form a relatively weak bond therebetween. This is thought to result from a generally parallel orientation of the polymer molecules as a result of the high shear conditions within the die. In the finished cable this bond between adjacent regions of the plastics material is easily broken on application of pressure thereto.

Axial or linear adjustment of the position of the point assembly relative to the die throat may be provided by co-operating screw threads 122 (FIG. 1)on the point assembly and extruder head. Rotational movement of the point assembly e.g. to introduce an S/Z twist of the transmission elements may be provided by a bearing 123 (FIG. 1) mounted on the extruder head which bearing carries the point assembly.

In use the axial position of the point assembly relative to the die throat is adjusted to balance or equalize the flow of plastics material within and outside the shield 21. This ensures void-free coating of the transmission package.

The technique may be employed with a number of cable plastics materials. These include, but are not limited to, plasticised polyvinyl chloride (PVC), low smoke zero halogen materials and thermoplastic rubbers. The plastics may contain a filler to control the extrusion properties of the material.

Figure 3:
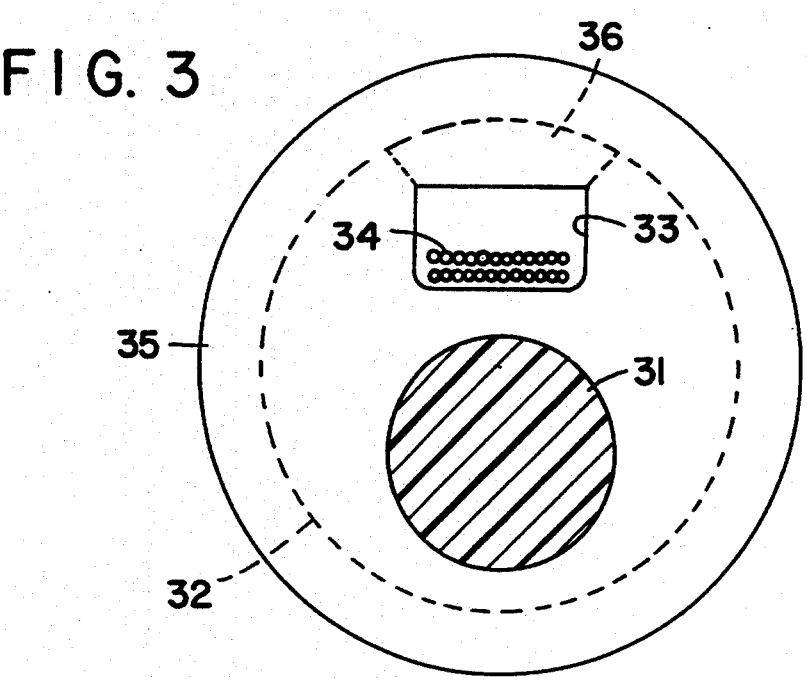
FIG. 3 is a cross-sectional view of a cable construction fabricated via the extruder of FIG. 1.

FIG. 3 shows a cable construction formed using the point assembly of FIG. 2. The cable comprises a central strength member 31, formed e.g. from a glass fibre reinforced plastics material, surrounded by a body 32 of unreinforced plastics. The body 32 contains a channel 33 in which one or more optical fibre elements 34 is accommodated. Typically the optical fibre elements are ribbon elements. The plastics body 32 has a circumferential outer or sheathing region 35 and a further capping region 36 immediately above the channel. The regions 35 and 36 are formed by the plastics flow partitioning technique described above.

Access to the fibre elements 34 is effected by first cutting into the outer region 35 above the channel 33 to reach the first region within 35. The plastics is peeled apart at this first region to expose the underlying plastics above the channel. The body is then split along the second region 36 to expose the channel and access the fibre elements.

Figure 4:
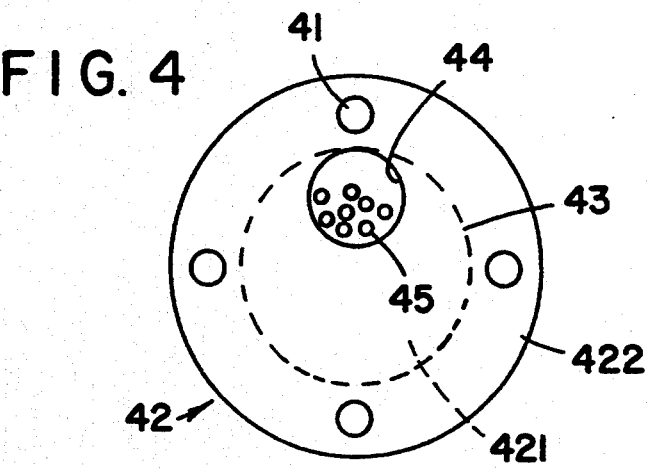
FIG. 4 depicts a further cable construction.

An alternative cable structure is shown in FIG. 4. This structure has a number of, typically four, dielectric strength members 41 generally symmetrically arranged around the circumference of the cable body 42. This body comprises an inner plastics member 421 and an outer plastics member 422, there being a weak bond at the boundary 43 therebetween. The inner body member 421 incorporates a channel or tube 44 in which a number of optical fibre elements 45 are disposed. These elements 45 may comprise ribbon fibres or individual optical fibres. Advantageously the tube or channel 44 follows a generally helical path along the cable either as a one-handed helix or as alternate right and left-handed (S-Z) helices. In use, the fibre elements 45 are accessed by cutting into the outer body member 422 and peeling that member back by breaking the bond at the boundary 43 whereby to expose the tube or channel 44.

It will be appreciated that although the technique has been described with particular reference to optical cables, it may also be employed in the manufacture of cables incorporating metal e.g. copper transmission elements.

I claim:

1. A method of manufacturing a fibre optic cable by extrusion of a plastics material through a die around a fibre optic element so as to contain the element loosely, wherein during extrusion the flow of the plastics material is partitioned into two or more separated flows by a tubular member in advance of the die and through which the fibre optic element is fed over a distance such that, when the flows recombine a weak bond is formed at the interface between the recombined flows thereby to facilitate selective splitting of the plastics material of one flow of the cable from the plastics material of the other flow to access the fibre optic element and wherein the position of the tubular member is adjusted relative to the die whereby to balance or equalize the plastics flow.

2. A method as claimed in claim 1, wherein a reinforced strength member is incorporated in the cable.

3. A method as claimed in claim 2, wherein said strength member is a dielectric strength member.

4. A method as claimed in claim 1, 2 or 3, wherein the extruded plastics material comprises polyvinyl chloride, a low smoke zero halogen material or thermoplastic rubber.

5. An apparatus for manufacturing a fibre optic cable, the apparatus including a plastics extruder for providing a plastics protection around a fibre optic element by extrusion through a die, the extruder having a tubular member with an exterior and an interior bore through which the optic element is fed and said tubular member being arranged to partition extruded plastics material into two or more separate flows over a distance such that, when the flows are recombined, a weak bond is formed therebetween whereby to facilitate selective splitting of the plastics of the cable to access the fibre optic element and means for adjusting the position of the tubular member relative to the die whereby in use to balance or equalize the plastics flow.

6. A method of manufacturing a fiber optic cable in which a body of plastics material having a longitudinally extending passageway has at least one optical fiber loosely received in said passageway and in which the plastics material is extruded through a die, said method comprising:

providing a tubular member having an interior bore and an exterior, an input end and an output end;

providing a die at, and spaced from, said output end of said tubular member for forming the exterior of said body;

supplying said plastics material at said input end of said tubular member both to the exterior and to the interior bore of said tubular member thereby to provide separated flows of said plastics material, at least one flow outside said tubular element and at least one flow inside said tubular element, said flows recombining at said die and said tubular element having a length such that when said flows recombine, the bond between the flows is weaker than the strength of the adjacent plastics material whereby the plastics material of one of said flows can be readily split away from the plastics of another of said flows; and as said plastics material is supplied to said input end of said tubular member, passing said at least one optical fiber through said interior bore of said tubular member.

7. A method as set forth in claim 6 wherein said tubular member is adjustable toward and away from said die and is adjusted relative to said die to balance the flow of said plastics material.

8. A method as set forth in claim 7 wherein said tubular member is rotatable about its longitudinal axis and is rotated during the supply of said plastics material at said input end of said tubular member.

* * * * *